United States Patent
Watts et al.

(10) Patent No.: US 7,244,500 B2
(45) Date of Patent: Jul. 17, 2007

(54) SMART COATING SYSTEM

(75) Inventors: Daniel J. Watts, Monmouth Junction, NJ (US); Laura Battista, Hamburg, NJ (US); James Zunino, Boonton Township, NJ (US); Nelson Colon, Verona, NJ (US); John Federici, Westfield, NJ (US); Gordon Thomas, Princeton, NJ (US); Hee C. Lim, Edison, NJ (US); Zafar Iqbal, Morristown, NJ (US); Joseph Argento, Newton, NJ (US); Haim Grebel, Livingston, NJ (US); Somenath Mitra, Bridgewater, NJ (US); Yan Zhang, Roselle, NJ (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/307,611

(22) Filed: Feb. 14, 2006

(65) Prior Publication Data

US 2006/0182160 A1    Aug. 17, 2006

Related U.S. Application Data

(60) Provisional application No. 60/593,798, filed on Feb. 15, 2005.

(51) Int. Cl.
*B32B 9/00* (2006.01)
*G01N 17/04* (2006.01)

(52) U.S. Cl. .............................. 428/408; 436/6; 73/86
(58) Field of Classification Search ................ 428/408; 372/43.01; 436/6; 374/56, 132; 236/910; 73/86, 768–780; 359/265–275; 118/663–694; 136/208, 232; 345/173
See application file for complete search history.

(56) References Cited

U.S. PATENT DOCUMENTS

| | | | |
|---|---|---|---|
| 6,331,438 B1 * | 12/2001 | Aylott et al. ................ | 436/172 |
| 6,527,849 B2 * | 3/2003 | Dry ............................ | 106/677 |
| 6,564,620 B1 * | 5/2003 | Jaeger .......................... | 73/86 |
| 6,941,818 B2 * | 9/2005 | Rakowski .................... | 73/762 |
| 2003/0227663 A1 * | 12/2003 | Agrawal et al. ............ | 359/265 |
| 2005/0079386 A1 * | 4/2005 | Brown et al. ............... | 428/690 |

OTHER PUBLICATIONS

Dry, Carolyn and McMillan, Willam, "A Novel Method to Detect Crack Location and Volume in Opaque and Semi-Opaque Brittle Materials", 1997, Smart Materials and Structures, 6, pp. 35-39.*

* cited by examiner

*Primary Examiner*—Jennifer McNeil
*Assistant Examiner*—Jonathan Langman
(74) *Attorney, Agent, or Firm*—John F. Moran

(57) ABSTRACT

An active coating system capable of collecting, analyzing, managing and adapting to data and/or its environment in real time. An exemplary embodiment of our inventive active coating system is corrosion resistant and includes a flexible sensor layer, a switch layer and a visual display layer. Operationally, the flexible sensor layer senses particular environmental conditions and the visual display layer provides visual indication of the condition(s) sensed.

16 Claims, 10 Drawing Sheets

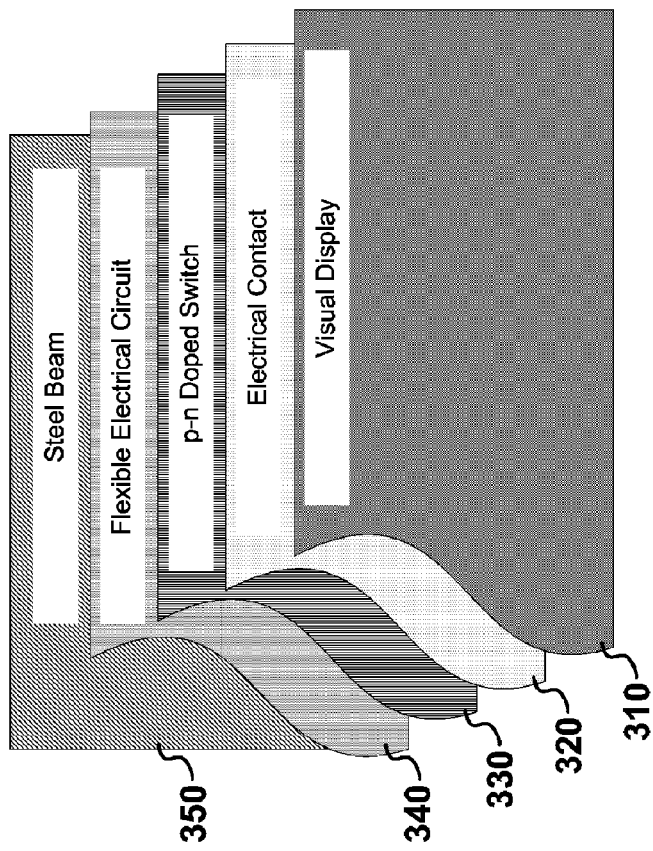

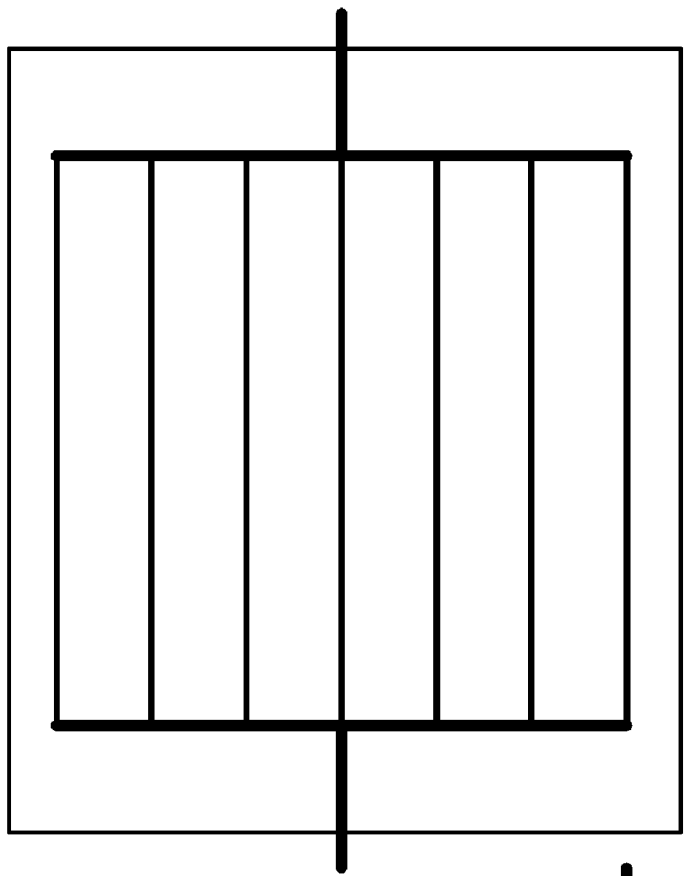
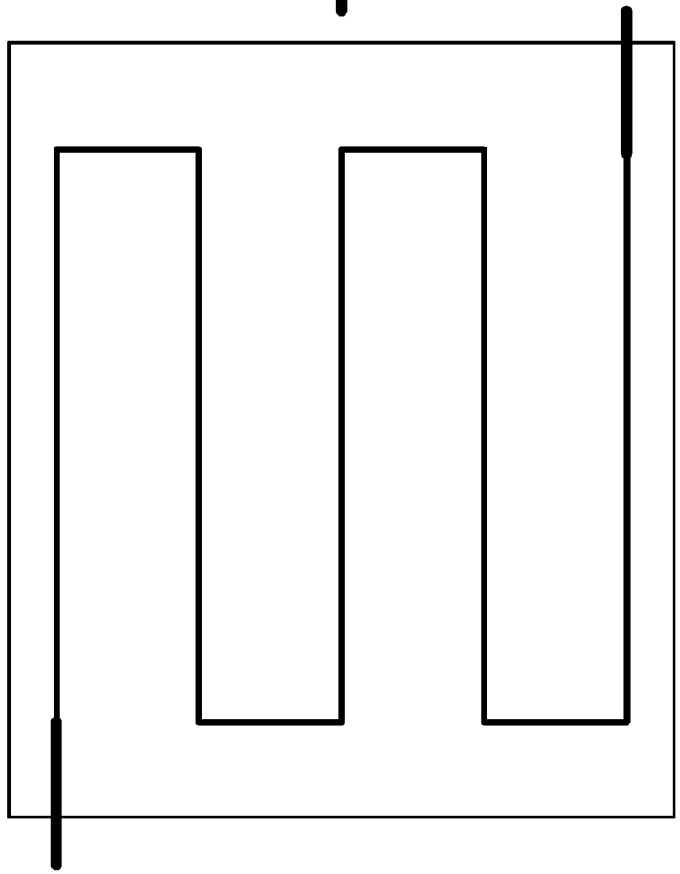
FIG. 5

SMART COATING SYSTEM

CROSS REFERENCE TO RELATED APPLICATION

This application claims the benefit under 35 USC 119(e) of U.S. Provisional Patent Application No. 60/593,798 filed Feb. 15, 2005, the entire file wrapper contents of which provisional application are herein incorporated by reference as though set forth at length.

UNITED STATES GOVERNMENT INTEREST

The inventions described herein may be manufactured, used and licensed by or for the U.S. Government for U.S. Government purposes.

FEDERAL RESEARCH STATEMENT

The invention described herein may be made, used, or licensed by or for the United States Government for government purposes without payment of any royalties thereon or therefore.

FIELD OF THE INVENTION

This invention relates generally to the field of material coatings, and in particular to a class of active, multilayered integrated coating(s) providing substrate protection, hazard warning, variable aesthetics, and self-repair.

BACKGROUND OF THE INVENTION

For centuries, coatings of various types have been used for the protection and beautification of a variety of materials and surfaces. Contemporary paints and coatings comprise countless compounds uniquely formulated to fulfill the varied requirements of hundreds of thousands of applications. For example, "paint" ranges from the broad group of environmentally-friendly latex paints that many consumers use to decorate and protect their homes and the translucent coatings that line the interior of food containers, to the chemically-complex, multi-component finishes that automobile manufactures apply on an assembly line. Despite their near-limitless variety however, contemporary coatings are invariably a "passive" type of coating.

Most recently however, a new type of "active" coating has been reported. Such an active coating will monitor its environment and "adapt" as designed and/or appropriate. For example, an active coating may provide an active corrosion protection such as by cathodic-type protection or can detect and facilitate the repair of damage to the barrier integrity of the coating. Similarly, an active coating and system may change colors or pattern(s) on command, or automatically in response to changing environmental conditions such as temperature, moisture, or presence of contaminants. (See, e.g., http://www.sciencenews.org/pages/sn_arc97/12_6_97/fob2.htm;

http://www.nsti.org/procs/Nanotech2005v3/7/W919.03;

http://www.njit.edu/publicinfo/publibrary/report2003/watts.php/;

http://www.highbeam.com/libary/doc0.asp?fr=1&full=yes&docid=1G1:98255207&refid=1s_pub&skeyword=&teaser=origurl=http://www.highbeam.com/library/doc3.asp?docid=1G1:98255207&refid=Is_pub&skeyword=&teaser=;

http://nanotechwire.com/news.asp?nid=500;

http://news.bbc.co.uk/1/hi/technology/2386731.stm;

http://www.popsci.com/popsci/science/07e6359b9fa84010vgnvcm1000004eecbccdrcrd.ht ml;)

Such coating system(s) offer the potential to revolutionize coatings, the industries they serve and the products which employ them. Such a coating system is the subject of the present invention.

SUMMARY OF THE INVENTION

We have developed, in accordance with the principles of the invention, an active coating system capable of collecting, analyzing, managing and adapting to data and/or its environment in real time.

One exemplary embodiment of our inventive active coating system is corrosion resistant and includes a flexible sensor layer, a switch layer and a visual display layer. Operationally, the flexible sensor layer senses particular environmental conditions and the visual display layer provides visual indication of the condition(s) sensed.

Advantageously, and more generally, according to the principles of our invention if an anomaly to the coating is detected—such as a scratch, or strain or sufficient corrosion—sensors embedded within the coating will collect and analyze data pertaining to that anomaly and initiate a suitable response(s). Such a response may be, for example, a self-healing operation or color change within the coating to heal and/or indicate the anomaly. As can be immediately appreciated by those skilled in the art, when our inventive teachings and resultant coatings are applied to motor vehicles, for example, maintenance is greatly simplified.

BRIEF DESCRIPTION OF THE DRAWING

A more complete understanding of the present invention may be realized by reference to the accompanying drawing in which:

FIG. 3 is a diagram of a cross-sectional view of the color-changing active coating system of FIG. 2;

FIG. 5a and FIG. 5b are layout schematics of linear and parallel heating elements respectively, suitable for application in the active coating system of FIG. 2.

DETAILED DESCRIPTION

Figure 1:
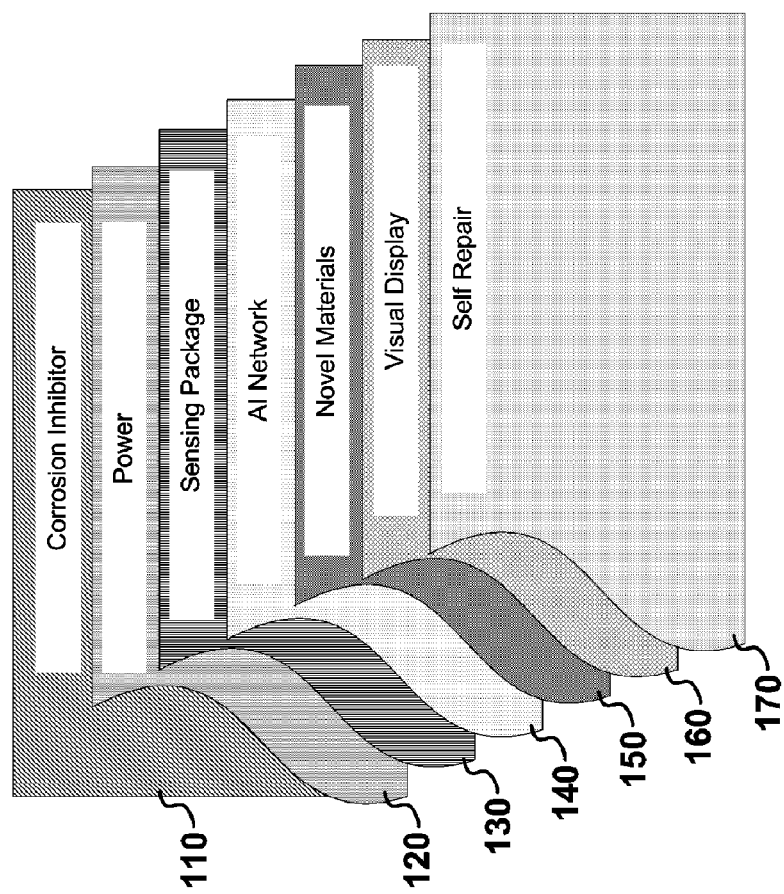
FIG. 1 is a diagram of a cross-sectional view of a representative multi-layer active coating system according to the present invention.

FIG. 1 is a cross-sectional view of a representative coating system according to the present invention. Not specifically shown in this FIG. 1, is a substrate upon which the coating system is applied (vehicle, building, etc). From our discussion of this inventive coating system however, those skilled in the art will readily recognize nearly any material may serve as a substrate, and further appreciate the wide applicability of such systems, in a virtually limitless set of fields.

Returning now to that FIG. 1, the particular coating system 100 shown therein comprises a number of layers—each generally providing particular function. And while the particular system 100 shown in this FIG. 1 includes seven (7) layers, the actual number of layers and the function(s) of each, may advantageously vary from application to application.

As shown in FIG. 1, corrosion inhibitor layer 110, shown at the bottom of this particular system 100, is adjacent to, and bonds the system 100 to a substrate (not shown). Such corrosion inhibiting materials are generally well known and may include inorganic conversion materials and/or active polymeric materials as appropriate. Of further advantage, certain corrosion inhibiting materials that may comprise this corrosion inhibition layer 110 may advantageously, chemically self-heal. By way of example only, certain chromium complexes on aluminum substrates have the ability to self-heal.

Shown overlying the corrosion inhibition layer 110 is a power layer 120, which in this exemplary system, provides power to other layers as required. Advantageously, with our inventive system, a power layer 120 such as that depicted, need not merely distribute power to the other layers, it may additionally/alternatively regulate and/or filter power for use by other layers. Still further, such layers may be made electrochemically active such that they generate power, in addition to regulating/filtering the power so generated.

A sensor/sensing package layer 130 is shown in FIG. 1 overlying the power layer 120. Advantageously, the sensor/sensing package layer 130 may include a plurality of sensors, of similar or dissimilar type. Types of sensors included in layer 130 may include, temperature, strain, conductivity, pressure, corrosion, substrate integrity, radiation levels, chemicals, etc. Such sensor package layer(s) 130 may be provided in flexible arrays, capable of physically conforming to a variety of substrate shapes and surface characteristics.

In certain applications there may be more than one sensing layer. In other applications, a sensing layer may be used that comprises one-or-more sensor types located adjacent to each other in the sensing layer. Of further advantage, sensor output may be relayed or otherwise transmitted to remote systems or displays for notification and/or action—as appropriate.

Of course, it is not necessary to transmit sensor data/information to systems "outside" of the coating structure 100. Advantageously, data/information processing systems may also reside within the coating structure 100, in close physical proximity to the sensor layer 130 and its accompanying sensors.

Such a local data/information processing layer comprises Artificial Intelligence (AI)/Network layer 140 shown in this FIG. 1 overlying the sensor layer 130. Such AI layer(s) 140 may advantageously receive as input, data which is sensed by sensor layer 130 and process and/or react to that input data as appropriate.

One such reaction to input data may include, for example, color or pattern changing to provide camouflage or other color characteristic(s). Shown in FIG. 1 is a visual display layer 160, which may advantageously "react" to environmental conditions. One such use of this particular visual display layer 160 is to provide the aesthetic/tactical color-change characteristic described previously namely, changing color to camouflage or provide pleasing aesthetics. Alternatively, such color change(s) may be advantageously used to provide information about the status/condition of the coating system 100, itself.

By way of example, recall that one sensory function of sensor layer 140 may be to sense/monitor the integrity of the coating system itself. Accordingly, when a breach, or sufficient change to the coating is detected from corrosion say, the sensor layer 140 may provide data to the AI layer 140 which in turn signals the visual layer 150 to change to a color indicative of the corrosion and/or breach.

Alternatively and of further advantage, with particular visual layers 160, it is not necessary to be explicitly signaled from sensory/processing layers to initiate the color change. For example, visual display layers 160 which change color upon physical/chemical contact with air, contaminants, temperature are all useful for our purposes. In this manner, the visual display layer 160 itself changes, without any interaction from other layers within the coating system 100. By way of further example, a visual display layer 160 that is "discolored", may be indicative of a breach or contact with particular environmental conditions. Multi-colored visual displays 160, may be indicative of multiple instances of contact with diverse environment(s).

Shown overlying the visual display layer 160, is self-repair layer 170. As is known to those skilled in the art, self-repair and micro-encapsulation techniques are in their infancy. As can be greatly appreciated by those skilled in the art, self-repair or self-healing layer(s) present the possibility for repair, with little or no human intervention. An obvious analogy is that of biological systems that automatically and autonomically initiate self-repair when they sustain damage.

The development of autonomous self-repairing or self-healing materials such as those employed in self-repair layer 170 is ongoing. Nevertheless, one useful approach to this self-healing layer 170 is through the use of microcapsules containing materials such as monomers than can repair coating damage by polymerizing or through other appropriate chemical or physical means.

As may be known by those skilled in the art, microcapsules are small—50-150 micron—containers that contain and release a small quantity of self-repair material, generally in liquid form, when they are broken. These microcapsules may be mixed, for example, in other known commercially-available topcoats (paints) or overcoats. Should the overcoating become damaged, the microcapsules break open and release coating repair materials. In effect, the coating system 100 becomes self-healing when damaged.

Finally, our inventive, representative coating system 100 may comprise new, or otherwise novel materials that work in conjunction with the other system layers, to sense, detect, display, and/or repair the coating and/or substrate, before the system is compromised.

Turning now to FIG. 2, there is shown a conceptual diagram depicting a representative color-changing coating system constructed according to the present invention. More specifically, the system 200 includes a thin film sensor 210 layer that senses strain in a substrate, an n-type/p-type doped single wall carbon nanotube (SWCNT) PN junction layer 230, a thermochromic color display layer 240 and a threshold sensing electronic and power supply circuit 220. Not specifically shown in this FIG. 2 is a heating element layer, which heats the thermochromic display layer 240 thereby initiating its color change in response to the heating. For the purposes of this exemplary embodiment, the electronic and power supply circuitry 220 is not a part of the actual coating per-se. In contrast, the sensor layer 210, the PN Junction layer 230, and the display layer 240 are all part of the coating film applied to the sample substrate.

In this exemplary embodiment, the strain sensor layer 210 provides an indirect measure of substrate corrosion by indicating the strain of a substrate as its material performance—and in particular load bearing characteristics—are modified due to changes caused by the corrosion process.

For our exemplary purposes, a substrate which underlies the above-mentioned layers was chosen due to its performance characteristics which include the ability to endure up to 1000 cycles of repeated bending without deformation, which is of interest to demonstrate the long-term applicability of our inventive coating system(s). In particular, the substrate chosen for this demonstration was 1018 stainless steel having a ⅛ inch thickness and 4 inch width.

The strain sensor layer 210 is a flexible layer and employs a wheatstone bridge design which is the subject of U.S. patent application Ser.No. 2004/0255682 the entire contents of which are incorporated herein by reference. A consideration for choosing such a bridge design is that it is relatively independent of environmental thermal effects.

Given the characteristics of the strain to be measured, strain sensor(s) having dimensions of substantially 1.7 cm×1.7 cm were employed. A number of which were bonded to the steel substrate using a commercially available, epoxy based adhesive. Advantageously, the particular adhesive exhibited sufficient after-cure flexibility, while being non-electrically conductive. As can be appreciated by those skilled in the art, any of a number of such adhesives may be used, and their selection is a matter of design choice.

The display layer 240 comprising thermochromic paint was employed to provide visual indication of the measured strain of the steel substrate. While a variety of color changing schemes are possible, the particular one chosen for our exemplary system turns from blue to yellow in color when heated. Since this particular thermochromic paint changes color upon heating, a heating layer in contact with the sensor layer and the thermochromic layer was employed.

Figure 2A:
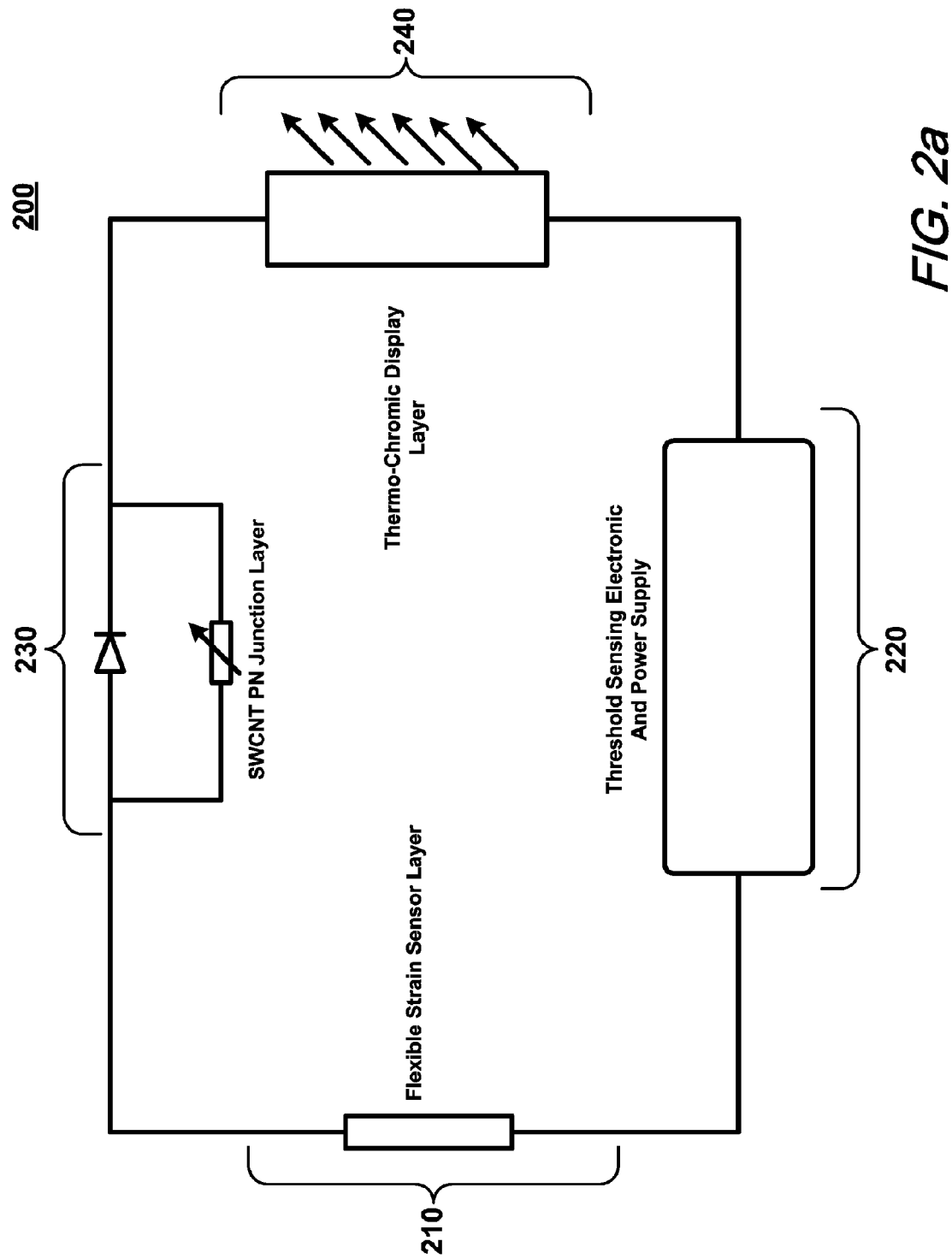
FIG. 2a is a conceptual diagram of a representative color-changing active coating system constructed according to the present invention.
Figure 2B:
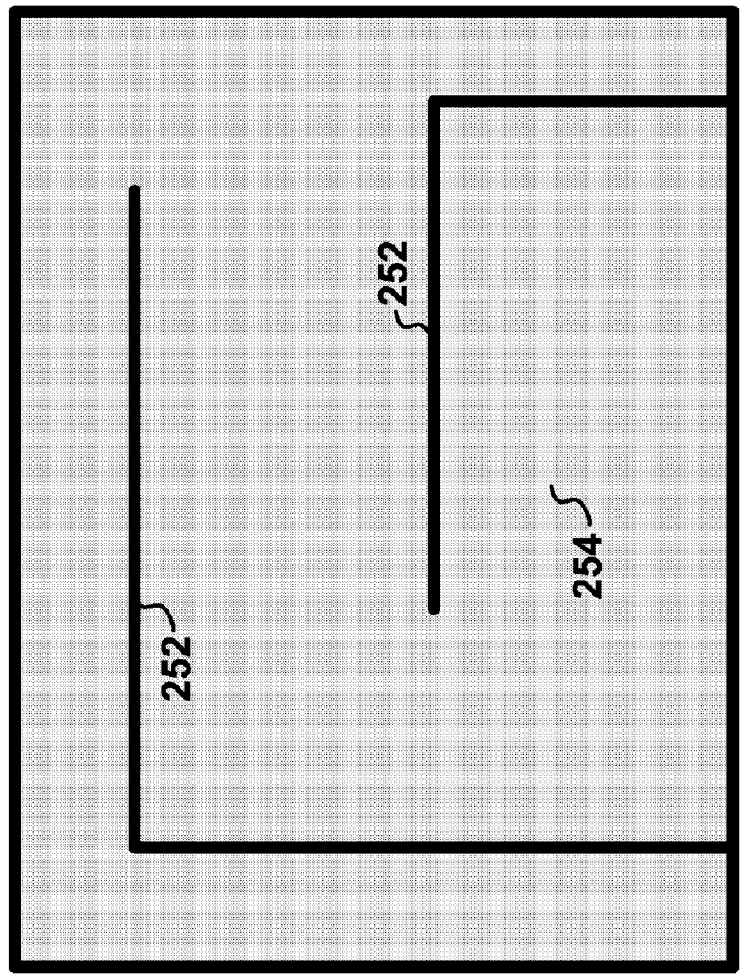
FIG. 2b is a layout schematic of a heating element employed in the representative color-changing coating system of FIG. 2, and constructed according to the present invention.

In particular, upon a signal from the strain sensor layer, heating is activated within a heating element, generally depicted in FIG. 2b. As employed, the heating element 250 comprises a number of printed, silver-ink bus bars 252, deposed in a field of silver ink film 254.

As can be appreciated, several types of commercially available silver paste/ink (e.g., PELCO® Colloidal Silver Paste, PELCO® Conductive Silver 187 and Fast Drying Silver Paint) and CAIG (CIRCUITWRITER) were evaluated. The heating layer and element(s) had to dissipate uniform heat in order to effect the thermochromic ink (40° F.) color change within 3 seconds. Fast Drying Silver Paint provided satisfactory functionality, namely remain flexible, low resistance and fast drying. The silver ink was then sprayed thinly on KAPTON (~100 micron thick). Generally, the resistance measured across the heating element is greater than 5.0 ohm to ensure color change in the desired interval.

Figure 2C:
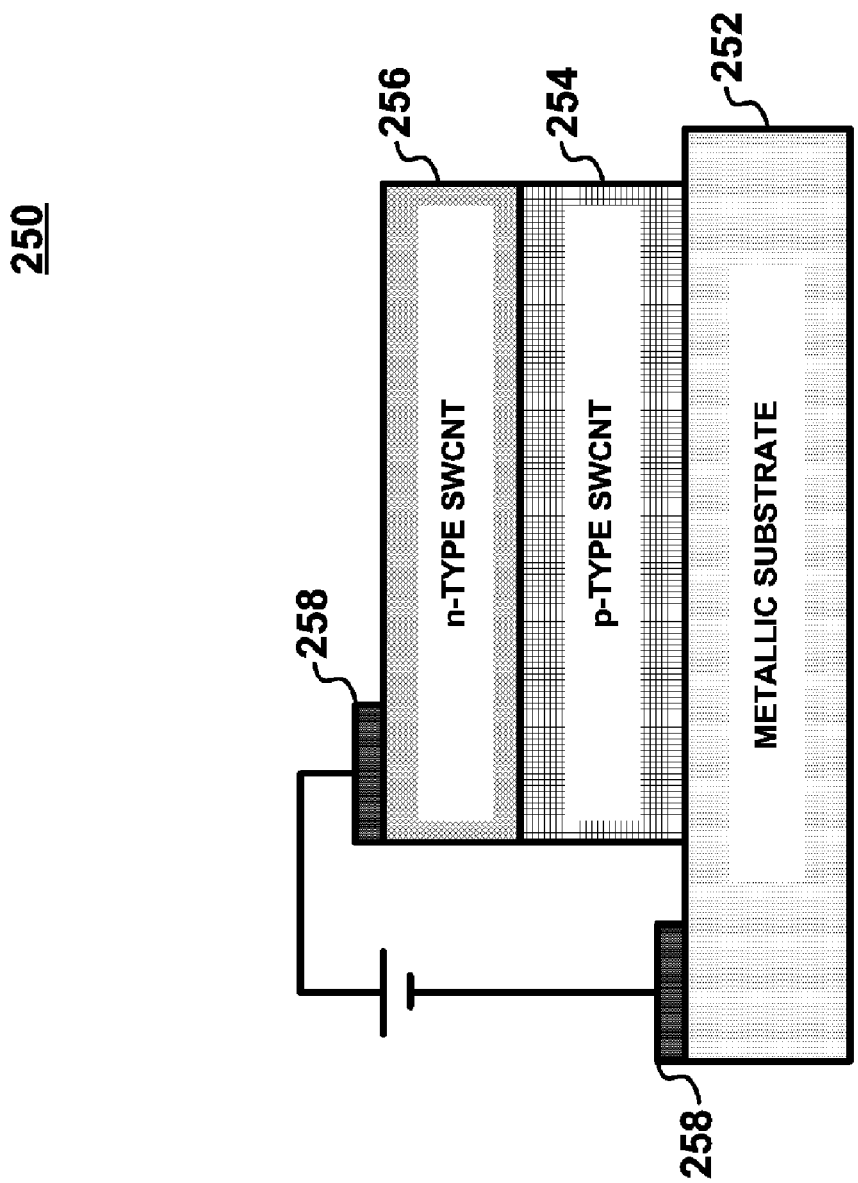
FIG. 2c is a cross-section schematic p-type/n-type single wall carbon nanotube PN junction employed in the representative color-changing coating system of FIG. 2, and constructed according to the present invention.

A single wall carbon nanotube (SWCNT) PN junction coating (FIG. 2-230) is shown in cross sectional schematic form in FIG. 2c-260. As can be seen from this FIG. 2c, the PN junction 260, generally comprises an n-type SWCNT 256 overlying a p-type SWCNT 254 which overlies a substrate 252.

The SWCNT were doped and deposited from paint or suspensions of charged and polymer-modified SWCNTs onto KAPTON-E. A thick layer (~200 nm) of Au was deposited first on a pre-treated KAPTON-E surface to serve as a cathode. The SWCNT 256 were doped by treatment of the nanotube with charge carrying polymers which techniques are generally known in the art. The length/width dimensions of the PN junction layer was substantially the same as the strain sensor layer.

Finally, the thermochromic display layer 240 was applied via screen-painting technique(s) to a thickness of substantially 100 microns. The display layer 240 was applied such that it overlies the heating element layer. As can be appreciated by those skilled in the art, display inks that exhibit a significant color change upon a predetermined change in temperature are well known. Accordingly, for our exemplary coating, the thermal activation temperature—that is the temperature at which the ink exhibits a significant color change—is established to be substantially 40° F.

At this point it is useful to note that while we have limited our exemplary discussion to a thermochromic visual display, our invention is advantageously not so limited. In particular, active coatings constructed according to our inventive teachings would benefit from alternative visual display technologies, e.g., electrochromic and/or electroluminescent. As is generally known, electrochromism is characterized by a reversible color change of a material resulting from the application of an electrical current or potential. One problem with electrochromic devices and materials is the delay needed to produce an optical change, on the order of one full second or more. Because of this delay, electrochromic applications have been limited. Fortunately this electrochromic delay is quite acceptable for certain applications of our inventive active coating system(s).

Similarly, electroluminescent devices and materials glow when an electrical current is passed through their structures. Advantageously, both electroluminescent and electrochromic visual displays may be made extremely thin and flexible, thereby providing a useful visual display for our inventive coating system(s).

Figure 2D:
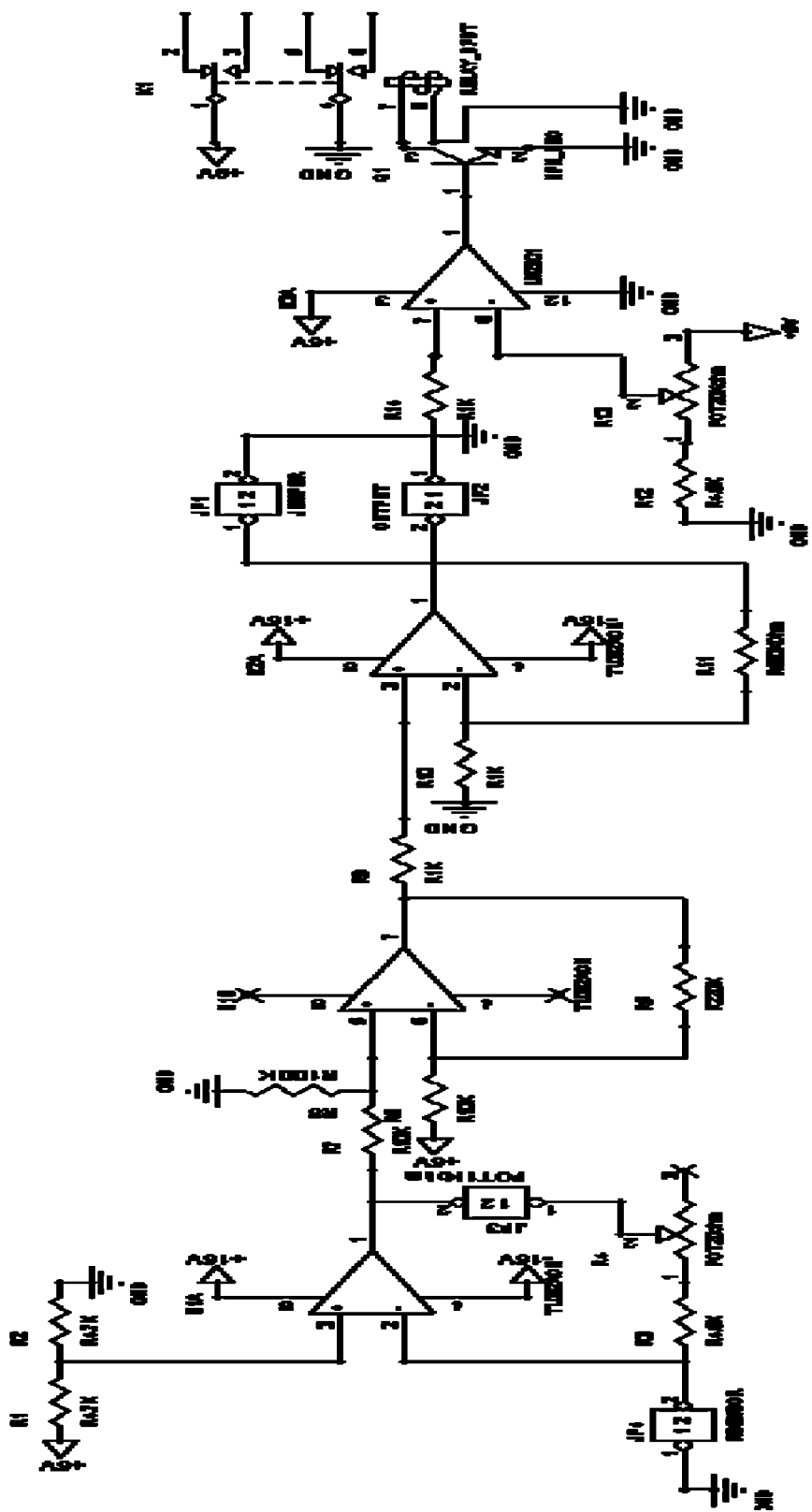
FIG. 2d is a schematic of an electronic circuit used in conjunction with the coating system shown in FIGS. 2a-2c.

FIG. 2d is a schematic of an electronic control circuit used to evaluate our inventive coating system. Advantageously, a comparator circuit along with a reeds relay, was included in the design to provide output threshold adjustment. This enables the setting and control of the operation level for the thermochromic display ink to change color. It may also used, for example, to prevent overloading when an external analog meter is connected/used. In addition, a 10-pF capacitor was included at an output port to dampen out any random noise and voltage spike. The reeds relay is used so that an external power source could be used to power the thermochromic display ink instead of draining the op-amp power supply. Of course, those skilled in the art will recognize that alternative electronic control circuits are useful with our inventive coating system and that such control circuits are well within the ability of those skilled in the art.

Turning now to FIG. 3, there is shown an exploded view of our demonstrative coating system 300 that exemplifies a number of aspects of our invention. More specifically, a chromic color display 310 layer, is shown overlying an electric contact layer 320, overlying a p-n doped switch layer 330, overlying a flexible electronics layer 340, overlying a steel beam layer 350. Such a multi-layer coating can, for example, be employed on military or other vehicles such as trucks and/or helicopter(s), aircraft, water-borne vessels, as well as stationary structures and almost any other constructed object that may benefit from such active coatings.

Advantageously, a coating system such as that shown in FIG. 3, is able to sense a change in the environment (applied pressure), analyze the change and alert a user of the anomaly through a color change. Significantly, the steel beam layer 250 is similar (at least in practice) to beams found in military vehicles such as trucks and/or helicopters.

As can be appreciated, the layer of flexible electronics 340 which overlies the steel beam layer 350 comprises one or more strain gages that sense(s) deformation of the steel beam layer 350, an amplified output signal which is directed to p-n-doped switch layer 330, which drives the display layer 310 to change color. In our exemplary embodiment, the p-n switch layer is quite thin, i.e., ≦10 microns in thickness.

Additional exemplary embodiments of a multilayer active coating system constructed according to the teachings of the present invention may now be considered. In particular, an embodiment employing a thin-film sensor that detects when the surface or another layer within the coating system becomes scratched or otherwise damaged. The purpose of such sensing is to alert personnel that a particular portion of the coating system has become compromised and needs maintenance or repair. Alternatively, or in conjunction with alerting personnel, the system may initiate self-repair. Finally, this embodiment may detect a disruption in an electrically conducting layer of the coating system and provide alert(s) to appropriate person(s).

Surface defects in an active coating may be detected by application of a thin film of an electrically conducting material and controlling a change in its conductivity. Advantageously, a variety of conducting materials—i.e., metal, carbon-containing composite, or conducting polymer—may be used. The conducting material is positioned at points of interest, where damage to the coating is to be detected. Of further advantage, the conducting material may be fabricated into a sensing element in virtually any shape or size, and subsequently applied by a variety of mechanisms, including suitable adhesives.

Of course, an active coating such as the one described may include one or more layers that prevent and/or inhibit corrosion and chemically self-repair. For example, a corrosion inhibiting/resistive layer containing chromium or other inorganic materials are known to be both corrosion resistive and exhibit a limited self-repair capability. In addition or alternatively, numerous organic polymeric materials would also suffice as corrosion inhibiting and as such would be principal components to such a corrosion inhibiting layer.

Figure 4:
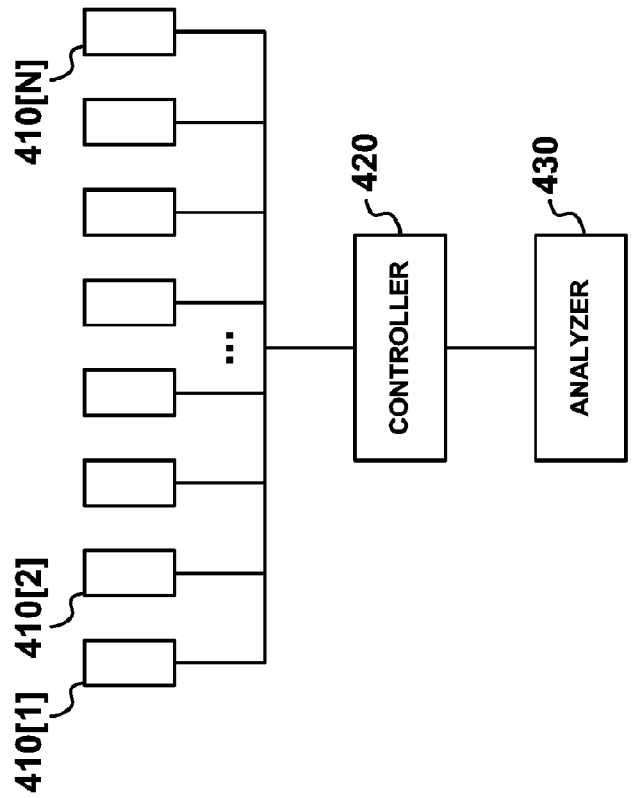
FIG. 4 is a schematic of an alternative sensor array for the detection of corrosion and/or damage, suitable for incorporation into active coatings according to the present invention.

FIG. 4 depicts a schematic of a network of sensors for the detection of corrosion and/or damage. With reference to that FIG. 4, a plurality of sensors 410[1] ... 410[N] comprise a sensor element fabricated from a thin layer of conducting compound or conducting composite. This sensing element, which is only 5-50 µm thick, may be covered with a nonconducting protective coating as well. In operation, damage to the overall coating system will result in damage to the sensor element, which may be detected by controller 420 as a change in resistance of the sensing element, and subsequently analyzed by analyzer 430. Advantageously, such a sensitive sensing element may be affected by environmental conditions such as temperature, which may also alter its conductivity and response. Consequently, with proper characterization, sensor elements such as that shown in FIG. 4 may be used for sensing these environmental conditions as well.

Such a sensor element may be prepared on a glass or other suitable substrate including flexible polymers such as KAPTON for easy inclusion into coating systems. For this exemplary sensor however, ORGACON films were spin-coated on glass slides for substantially 1 minute using a commercially available spincoater. The resulting films were dried and cured on a hotplate. When prepared in this manner, the flexible polymer film thickness is between 1 and 100 microns.

As can be appreciated, V-I relationship(s) may be conveniently measured and calculated as:

$$R_{sq} = \frac{\pi}{\ln 2}\left(\frac{V}{I}\right) \approx 4.532\left(\frac{V}{I}\right)$$

The temperature resistivity coefficients may be calculated as:

$$y_T = \frac{1}{\Delta T}\left(\frac{R_T}{R_0} - 1\right)$$

where ΔT=T−25° C. is the deviation of the temperature from standard conditions, $R_T$ is the resistance at investigated temperature, and $R_0$ is the resistance at 25° C.

Turning now to FIG. 5, there is shown two scratch sensing elements (a) and (b) which depict linear (a) and parallel (b) sensing geometries, respectively. Such element(s) may be prepared by painting the circuit(s) on a glass surface as shown and then cured. It should be noted that additional/alternative geometries are possible, depending upon the particular application.

Figure 6A:
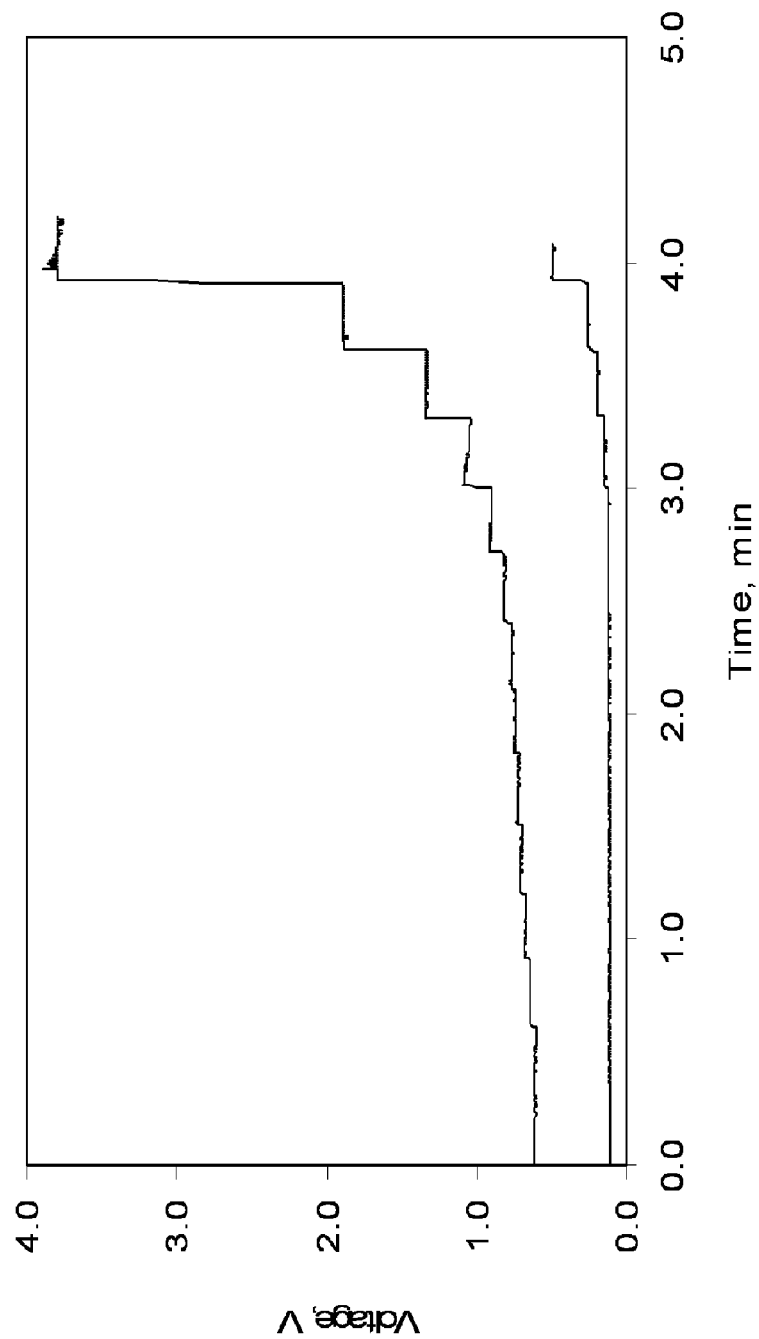
FIG. 6a and FIG. 6B are graphs showing scratch test responses for sensors constructed according the present invention.
Figure 6B:
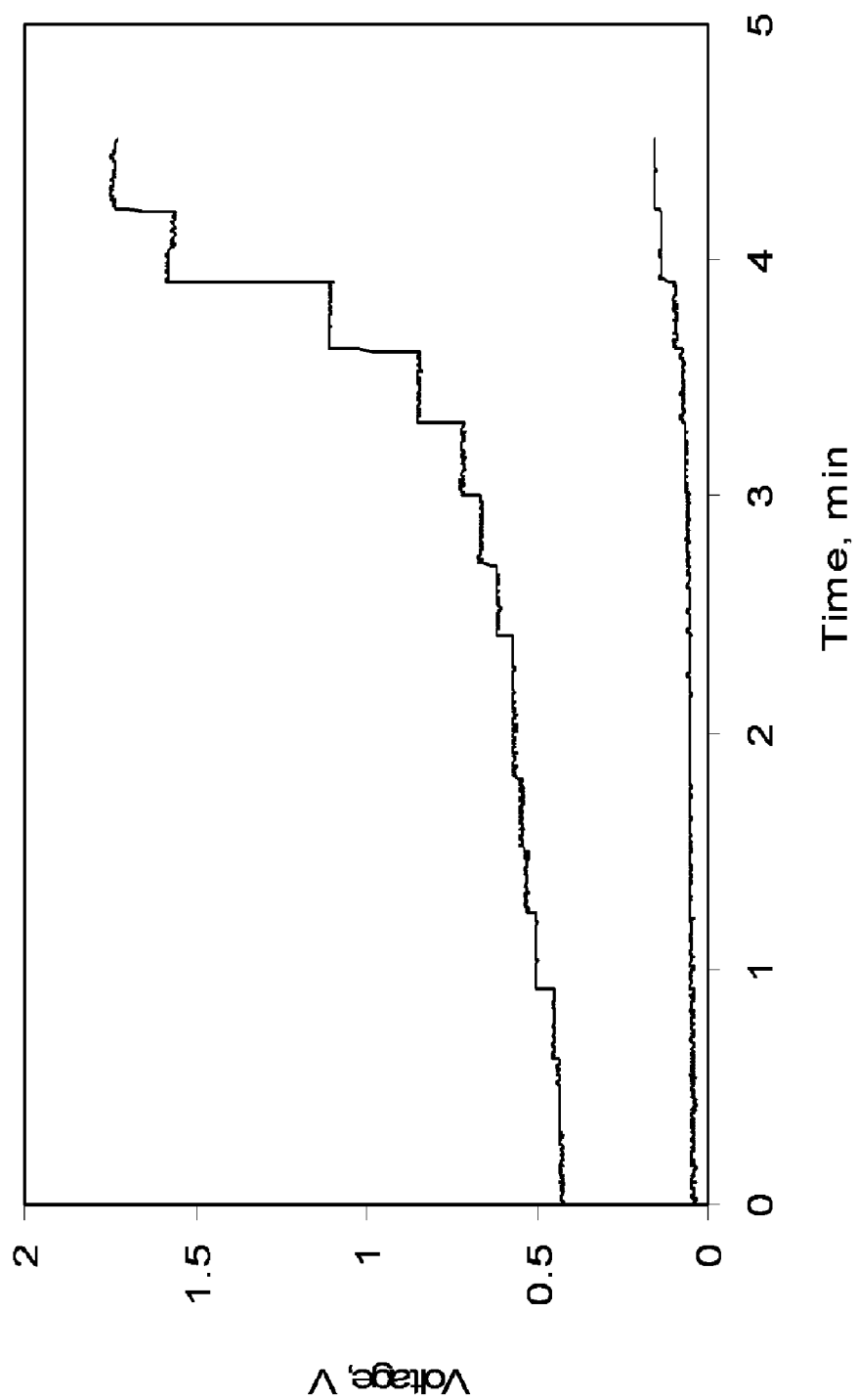

FIG. 6(a) and FIG. 6(b) show the responses of a 14 strip sensing element where each strip was scratched every 30 seconds. The strips shown in FIG. 6(a) and FIG. 6(b) were constructed using ORGACON EL-P3040 and ORGACON EL-P 4010. As can be appreciated, the relatively high resistivity of conductive polymers make them particularly useful in the fabrication of sensing elements such as those shown in FIGS. 6(a) and 6(b)—and especially so in those sensing elements used for scratches or surfaces that are difficult to access. Advantageously, sensors constructed from conductive polymers facilitate the integration into multilayer coatings, such as those which are the subject of the instant application. Still further, it is understood by those skilled in the art that such sensors are useful in any situation in which a monitored event will produce a change in resistivity in a sensor layer such as that shown and described. Consequently, once an event is sensed, appropriate notification and/or repair may occur, as appropriate.

At this point, while we have discussed and described my invention using some specific examples, those skilled in the art will recognize that my teachings are not so limited. More specifically, we have described coatings that exhibit a specific number of layers and compositions. It is understood that additional (or fewer) layer(s) may be provided by such coatings. Accordingly, our invention should be only limited by the scope of the claims attached hereto.

What is claimed is:

1. An active coating comprising:
 a plurality of layers arranged in a stack and overlying a substrate, the stack of layers including:
  a sensor layer for sensing particular conditions;
  a visual display layer for providing visual indication of conditions sensed by the sensor layer; and
  a switch layer interposed between the sensor layer and the visual display layer, said switch layer in electrical communication with the sensor layer and the visual display layer for electrically enabling the visual display layer to selectively provide visual indication of the conditions sensed by the sensor layer.

2. The active coating of claim 1 wherein said visual display layer is an electrochromic visual display layer.

3. The active coating of claim 1 wherein said visual display layer is an electroluminescent visual display layer.

4. The active coating of claim 1 wherein said visual display layer includes:
 a thermochromic visual display layer; and
 a heating layer, for generating heat in response to a signal from the switch layer, said heat effecting a color change in the visual display layer.

5. The active coating of claim 1 wherein the stack of layers further comprises:
 a power distribution layer in electrical contact with one or more of the other layers for distributing electrical power to one or more of the other layers.

6. The active coating of claim 5 wherein the stack of layers further comprises:
 a power generation layer in electrical contact with the power distribution layer for generating electrical power for one or more of the other layers.

7. The active coating of claim 1 further comprising:
 a self-repair layer, for repairing damage to the active coating.

8. The active coating of claim 1 wherein said sensor layer comprises one or more strain sensors.

9. The active coating of claim 1 wherein said switch layer comprises a single wall carbon nanotube p-n-doped junction.

10. The active coating of claim 1 wherein said visual display layer $\leq 100$ microns in thickness.

11. The active coating of claim 1 having a thickness of $\leq 250$ microns.

12. The active coating of claim 1 wherein said sensor layer has a thickness of between 5 and 50 $\mu m$.

13. The active coating of claim 1 wherein said sensor layer comprises one or more scratch sensors.

14. The active coating of claim 1 wherein said sensor layer is a flexible array of sensors.

15. The active coating of claim 14 wherein the flexible array of sensors includes:
 a plurality of sensors for sensing different environmental conditions, said plurality of sensors selected from a group consisting of temperature sensor, conductivity sensor, pressure sensor, radiation sensor, chemical sensor, substrate integrity sensor, strain sensor, scratch sensor, and corrosion sensor.

16. The active coating of claim 1 wherein the stack of layers further comprises:
 a data processing layer overlying the sensor layer and in data communication with one or more of the other stacked layers,
 wherein the data processing layer receives input data from one or more of the other layers, processes the received data and controls one or more of the other layers in response to the received data from the sensor layer.

* * * * *